United States Patent
Harrison et al.

(10) Patent No.: US 7,864,958 B2
(45) Date of Patent: Jan. 4, 2011

(54) QUANTUM KEY DISTRIBUTION METHOD AND APPARATUS

(75) Inventors: Keith Alexander Harrison, Bristol (GB); William John Munro, Bristol (GB); Liqun Chen, Bristol (GB)

(73) Assignee: Hewlett-Packard Development Company, L.P., Houston, TX (US)

( * ) Notice: Subject to any disclaimer, the term of this patent is extended or adjusted under 35 U.S.C. 154(b) by 1005 days.

(21) Appl. No.: 11/454,632

(22) Filed: Jun. 16, 2006

(65) Prior Publication Data

US 2007/0014415 A1    Jan. 18, 2007

(30) Foreign Application Priority Data

Jun. 16, 2005    (GB) ................... 0512229.6

(51) Int. Cl.
*H04K 1/00* (2006.01)
(52) U.S. Cl. ...................... 380/256; 380/278
(58) Field of Classification Search ............ 380/256, 380/255, 260, 41, 270, 277, 278, 283, 44, 380/46, 262, 263; 713/168–171, 181; 714/758, 714/780; 708/250; 235/379–380
See application file for complete search history.

(56) References Cited

U.S. PATENT DOCUMENTS

| | | | | |
|---|---|---|---|---|
| 5,732,139 A * | 3/1998 | Lo et al. | ...................... | 380/28 |
| 6,678,379 B1 * | 1/2004 | Mayers et al. | ............... | 380/278 |
| 7,245,722 B2 * | 7/2007 | Hirota et al. | ................. | 380/256 |
| 7,260,222 B2 * | 8/2007 | Ishizuka et al. | ............. | 380/255 |
| 7,359,512 B1 * | 4/2008 | Elliott | ........................ | 380/253 |
| 2005/0157875 A1 * | 7/2005 | Nishioka et al. | .............. | 380/46 |
| 2006/0059343 A1 * | 3/2006 | Berzanskis et al. | .......... | 713/171 |
| 2006/0059403 A1 * | 3/2006 | Watanabe | .................... | 714/758 |

\* cited by examiner

*Primary Examiner*—Nirav Patel

(57) ABSTRACT

A quantum key distribution (QKD) method involves the sending of random data from a QKD transmitter to a QKD receiver over a quantum signal channel, and the QKD transmitter and receiver respectively processing the data transmitted and received over the quantum signal channel in order to seek to derive a common random data set. This processing is effected with the aid of messages exchanged between QKD transmitter and receiver over an insecure classical communication channel. The processing concludes with a check, effected by an exchange of authenticated messages over the classical communication channel, that the QKD transmitter and receiver have derived the same random data set. At least some of the other messages exchanged during processing are exchanged without authentication and integrity checking. A QKD transmitter and QKD receiver are also disclosed.

13 Claims, 4 Drawing Sheets

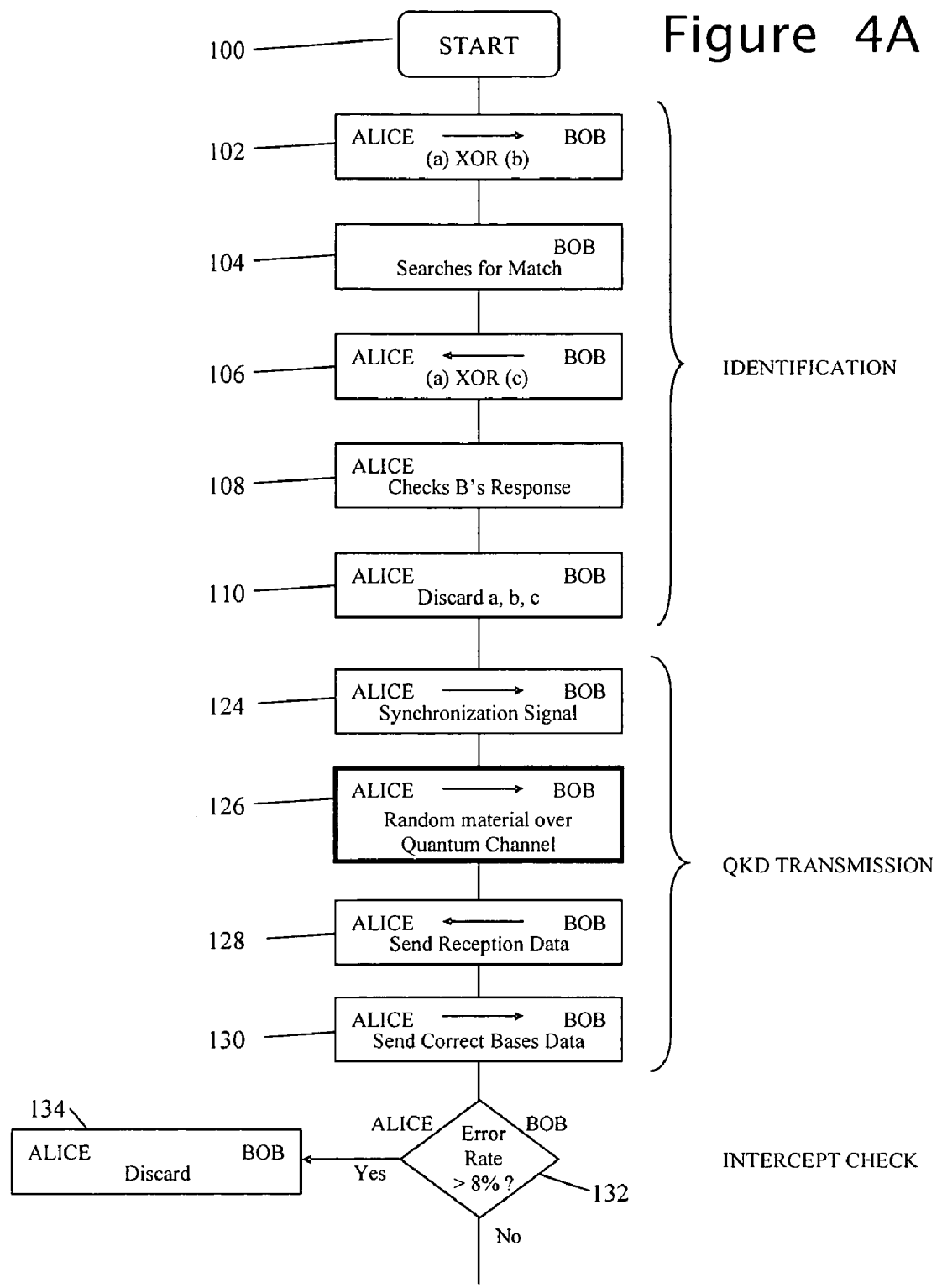

US 7,864,958 B2

QUANTUM KEY DISTRIBUTION METHOD AND APPARATUS

FOREIGN APPLICATION PRIORITY DATA

This application claims benefit of priority of Foreign Patent Application No. GB 0512229.6, filed in the Great Britain on Jun. 16, 2005, which is incorporated herein by reference.

FIELD OF THE INVENTION

The present invention relates to a quantum key distribution (QKD) method and apparatus.

BACKGROUND TO THE INVENTION

QKD methods and systems have been developed which enable two parties to share random data in a way that has a very high probability of detecting any eavesdroppers. This means that if no eavesdroppers are detected, the parties can have a high degree of confidence that the shared random data is secret. QKD methods and systems are described, for example, in U.S. Pat. No. 5,515,438 and U.S. Pat. No. 5,999,285. In known QKD systems, randomly polarized photons are sent from a transmitting apparatus to a receiving apparatus either through a fiber-optic cable or free space.

Whatever particular QKD protocol is used, QKD methods typically involve sending a random data set from a QKD transmitter to a QKD receiver over a quantum signal channel, the QKD transmitter and receiver then respectively processing the data transmitted and received via the quantum signal channel with the aid of messages exchanged between them over an insecure classical communication channel thereby to derive a common subset of the random data set. The processing includes an error correction phase during which a substantial number of messages are exchanged over the classical communication channel.

The classical communication channel is insecure in that it is not required to be confidential. However, in order to prevent a "man in the middle" type of attack, message authentication and integrity checking are still needed and are usually carried out for every message sent over the classical communication channel leading to a considerable processing overhead.

SUMMARY OF THE INVENTION

According to one aspect of the present invention, there is provided a quantum key distribution (QKD) method comprising:
  sending random data from a QKD transmitter to a QKD receiver over a quantum signal channel, and
  the QKD transmitter and receiver respectively processing the data transmitted and received over the quantum signal channel with the aid of messages exchanged between them over an insecure classical communication channel in order to seek to derive a common random data set, said processing concluding with a check, effected by an exchange of authenticated messages over the classical communication channel, that the QKD transmitter and receiver have derived the same said random data set, and at least some of the messages exchanged during said processing being exchanged without authentication and integrity checking.

According to another aspect of the present invention, there is provided a quantum key distribution (QKD) transmitter comprising:

a quantum signal transmitter for transmitting random data to a QKD receiver;
  an insecure classical communication transceiver; and
  a processing subsystem for processing the random data transmitted by the quantum signal transmitter, with the aid of messages exchanged with the QKD receiver via the classical communication transceiver, in order to seek to derive a common random data set, the processing subsystem being arranged to conclude said processing with a check, effected by an exchange of authenticated messages with the QKD receiver via the classical communication transceiver, that the QKD transmitter and receiver have derived the same said random data set,
the QKD transmitter being so arranged that at least some of the messages exchanged during said processing are exchanged without authentication and integrity checking.

According to a further aspect of the present invention, there is provided a quantum key distribution (QKD) receiver comprising:
  a quantum signal receiver for receiving random data from a QKD transmitter;
  an insecure classical communication transceiver; and
  a processing subsystem for processing the random data received by the quantum signal receiver, with the aid of messages exchanged with the QKD transmitter via the classical communication transceiver, in order to seek to derive a common random data set, the processing subsystem being arranged to conclude said processing with a check, effected by an exchange of authenticated messages with the QKD transmitter via the classical communication transceiver, that the QKD transmitter and receiver have derived the same said random data set,
the QKD receiver being so arranged that at least some of the messages exchanged during said processing are exchanged without authentication and integrity checking.

BRIEF DESCRIPTION OF THE DRAWINGS

The present invention will now be described, by way of example only, with reference to the accompanying diagrammatic drawings of example embodiments, in which:

FIGS. 4A and 4B together form a functional flow diagram illustrating an example method of operation of the system shown in FIGS. 1-3.

DESCRIPTION OF THE PREFERRED EMBODIMENTS

Figure 1:
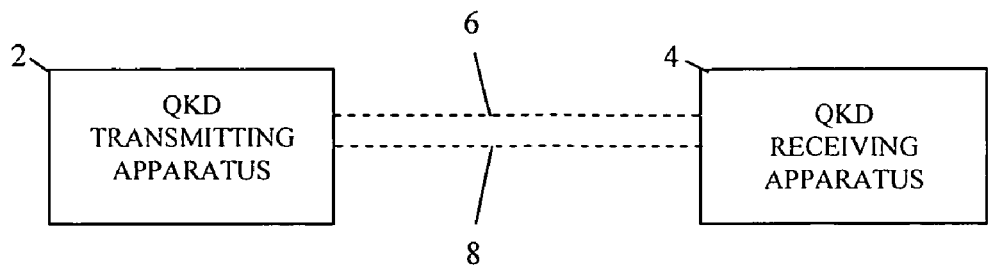
FIG. 1 is a schematic illustration of a quantum key distribution system embodying the present invention.

Referring to FIG. 1 of the accompanying drawings there is shown a quantum-key-distribution (QKD) system comprising a QKD transmitting apparatus 2 arranged to inter-work with complimentary QKD receiving apparatus 4 of the transaction terminal 5. The device 1 comprises, in addition to the QKD transmitting apparatus 4,:
  a control processor 9 (with associated program and data memories, not separately shown) for controlling the overall operation of the device,
  a classical communications channel transceiver 12 (that is, one not relying on quantum technology) such as an Infrared Data (IrDA) transceiver, a BLUETOOTH (Trade Mark) transceiver, the normal wireless communication transceiver of a mobile phone where the device 1 takes this form, or even an interface for a wired connection; and a user interface 47 such as a keypad and display.

The transaction terminal 5 comprises, in addition to the QKD receiving apparatus 4,:

a transaction processor 9;

a classical communications channel transceiver 50 arranged to inter-communicate with the transceiver 12 of the device 2; and a user interface 66.

In the course of inter-working of the QKD transmitting apparatus 2 and QKD receiving apparatus 4 two channels are established between the transmitting apparatus 2 and the receiving apparatus 4. The first channel 6 is a classical communication channel (that is, one not relying on quantum technology). The second channel 8 is a quantum channel provided by the sending of a quantum signal from the QKD transmitting apparatus 2 to the QKD receiving apparatus.

A quantum signal, in the present context, is a signal capable of conveying sufficient data to enable a quantum cryptographic transaction with another entity. Thus, for example, in one embodiment, a source and transmitter are required which are capable of preparing and transmitting the quantum state which it is desired to send to a requisite degree of accuracy.

A requirement for the successful transmission of the quantum signal in the quantum channel 8 is that the quantum signal is correctly aligned with a quantum signal detector of the receiving apparatus 4, both directionally and such that the polarization directions of the transmitting and receiving apparatus 2, 4 have the same orientation. This can be achieved by using a mounting cradle or similar physical structure (not shown) configured to seat the device 1 in a particular orientation. With the cradle appropriately fixed in position in front of the receiving apparatus 4 (the cradle can, for example be manufactured as an integral part of the structure of the receiving apparatus 4), when the device 1 is correctly seated in the cradle the desired alignment between the QKD transmitting and receiving apparatus 2 and 4 is achieved. Alternatively, an active alignment system can be provided that uses an alignment channel between the transmitting and receiving apparatus to generate alignment adjustment signals for use in aligning the transmitting apparatus 2 and the receiving apparatus 4. It will be assumed hereinafter that appropriate measures have been taken to ensure that the quantum signal output by the transmitting apparatus 2 is correctly aligned with the quantum signal detector of the receiving apparatus 4.

Figure 2:
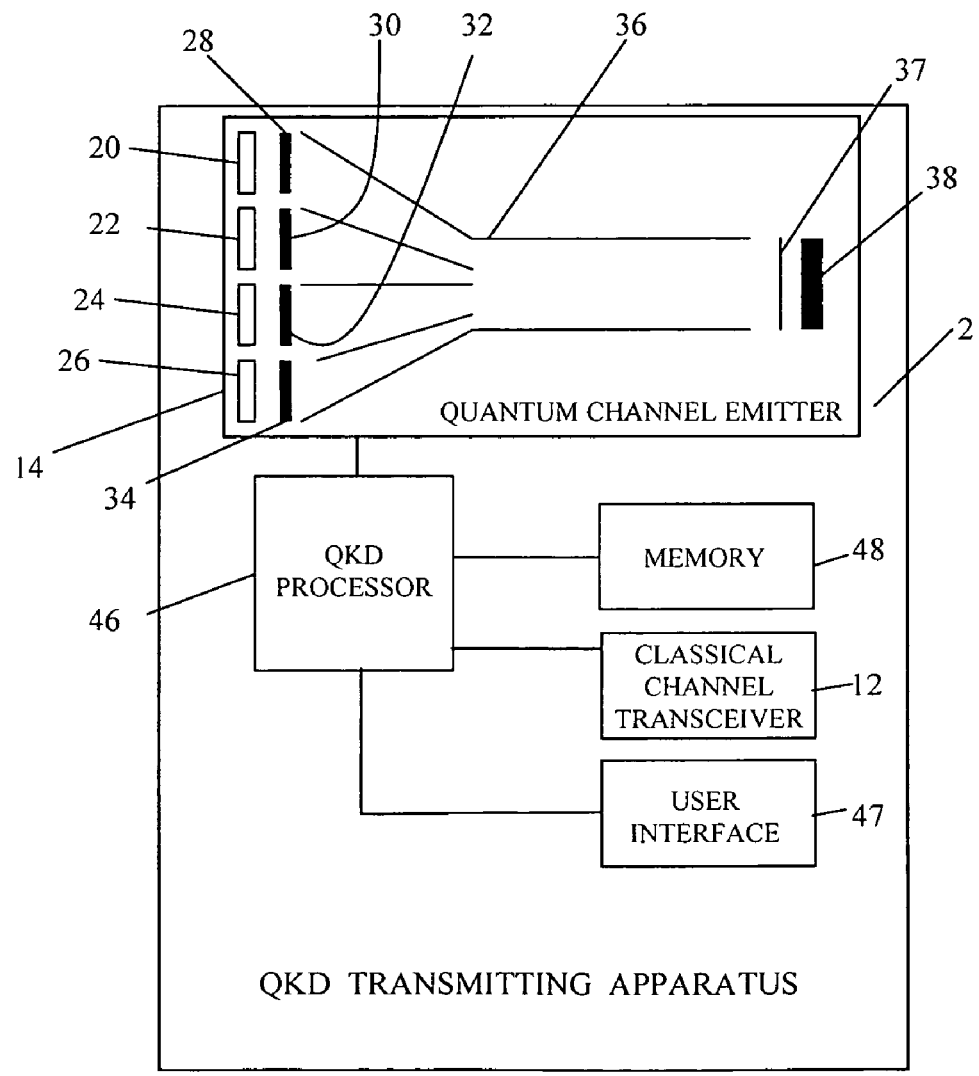
FIG. 2 is a schematic illustration of an embodiment of a quantum key distribution transmitting apparatus of the FIG. 1 system.

Referring to FIG. 2 of the accompanying drawings, the QKD transmitting apparatus 2 comprises:

a quantum channel emitter 14;

a processor 46;

a memory 48 for storing both data and control programs for controlling operation of the processor 46 to operate the transmitting apparatus 2 in the manner described below;

a classical channel transceiver 12 to provide a data communication channel between the QKD transmitting apparatus 2 and the QKD receiving apparatus 4; and a user interface 47.

The quantum channel emitter 14 comprises an array of light emitting diodes (LEDs) 20, 22, 24 and 26. In front of each LED 20, 22, 24 and 26 is a respective polarising filter 28, 30, 32, 34. Filter 28 polarises the photons emitted from LED 20 vertically, filter 30 polarises the photons emitted from LED 22 horizontally, filter 32 polarises the photons emitted from LED 24 diagonally and filter 34 polarises the photons emitted from LED 26 anti-diagonally (the directions of polarisation are stated relative to an intended orientation of the apparatus 2 when in use). Thus, after passing through the filters 28, 30, 32, 34, the photons are polarised in four directions, each at 45° to another thus providing two pairs of orthogonal polarisations. The LEDs 20, 22, 24, 26 are narrow frequency emitters such as those available from Agilent Technologies, Inc. of 395 Page Mill Rd, Palo Alto, Calif. 94306, United States e.g., one of the Sunpower series, emitting at 590 nm or 615 nm.

A fibre optic light guide 36 is provided to convey the polarised photons to an attenuation filter 37 and narrow band pass frequency filter 38. The purpose of the attenuation filter 37 is to reduce the number of photons emitted and the frequency filter 38 is to restrict the emitted photons to a narrow frequency range (typically plus or minus 1 nm). Without the attenuation filter 37 in place the number of photons emitted per LED pulse would be of the order of one million. With the filter in place, the average emission rate is 1 photon per 100 pulses. Importantly this means that more than one photon is rarely emitted per pulse. The attenuation filter 37 and frequency filter 38 can be combined in a single device if preferred. A spatial filter is provided to limit light leakage outside the channel.

Figure 3:
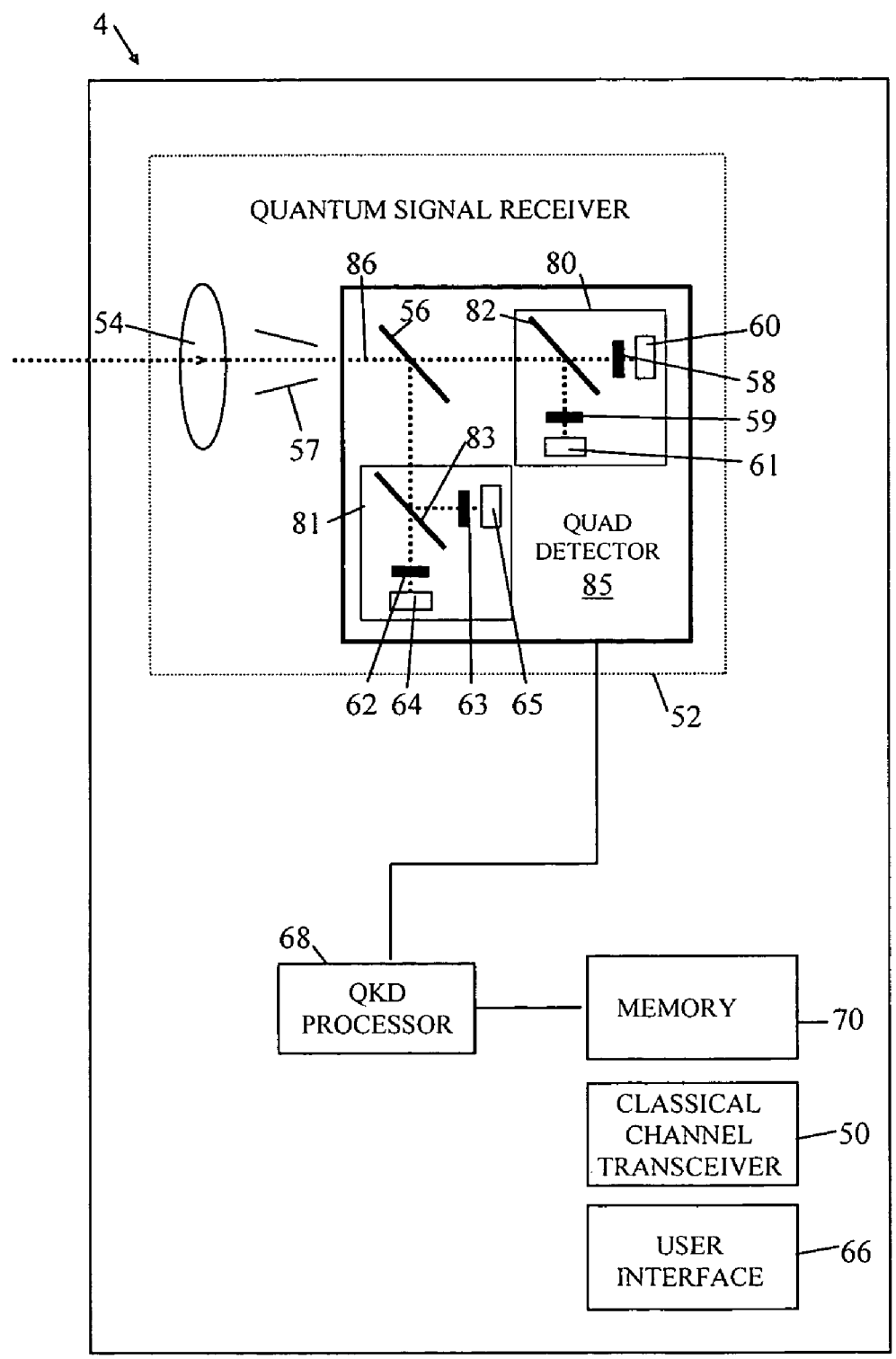
FIG. 3 is a schematic illustration of an embodiment of a quantum key distribution receiving apparatus of the FIG. 1 system.

The QKD receiving apparatus 4 is further explained with reference to FIG. 3 of the accompanying drawings. The receiving apparatus 4 comprises:

a quantum signal receiver 52 for receiving the quantum signal output from the QKD transmitting apparatus 2;

a processor 68;

a memory 70 for storing both data and control programs for controlling operation of the processor 68 to operate the QKD receiving apparatus 4 in the manner described below; and a classical channel transceiver 12 to provide a data communication channel between the QKD receiving apparatus 2 and the QKD transmitting apparatus 2; and a user interface 66

The quantum signal receiver 53 comprises a lens 54, a quad-detector arrangement 85, and a fibre optic light guide for conveying photons received through the lens to the quad-detector arrangement 85. The end of the light guide 57 nearest the lens 54 is fixed on the optical axis of the lens 55. The quad-detector arrangement 85 comprises a beam splitter 56, a first paired-detector unit 80, and a second paired-detector unit 81. The first paired-detector unit 80 comprises a beam splitter 82, polarizers 58, 59, and detectors 60, 61. The second paired-detector unit 81 comprises a beam splitter 83, polarizers 62, 63, and detectors 64, 65. The polarizers 58, 59 of the first paired-detector unit 80 have their directions of polarization orthogonal to each other; similarly, the polarizers 58, 59 of the second paired-detector unit 81 also have their directions of polarization orthogonal to each other. The polarization directions of the polarizers of the first paired-detector unit 80 are at 45° to the polarization directions of the polarizers of the second paired-detector unit 81. The beam splitters 56, 82 and 83 are depicted in FIG. 3 as half-silvered mirrors but can be of other forms such as diffraction gratings.

The detectors 60, 61, 64, 65 are avalanche photo-diodes, such as those available from Perkin Elmer Optoelectronics of 22001 Dumberry Road, Vaudreuil, Quebec, Canada, J7V 8P7 types C30902E, C30902S, C30921E and C30921S.

Dotted line 86 depicts the paths of photons passing through the lens 54 to the detectors 60, 61, 64 and 65 of the quad-detector arrangement 85.

Use of the device 1 in operating the transaction terminal 5 will now be described with reference to FIGS. 4A and B of the accompanying drawings.

Figure 4B:
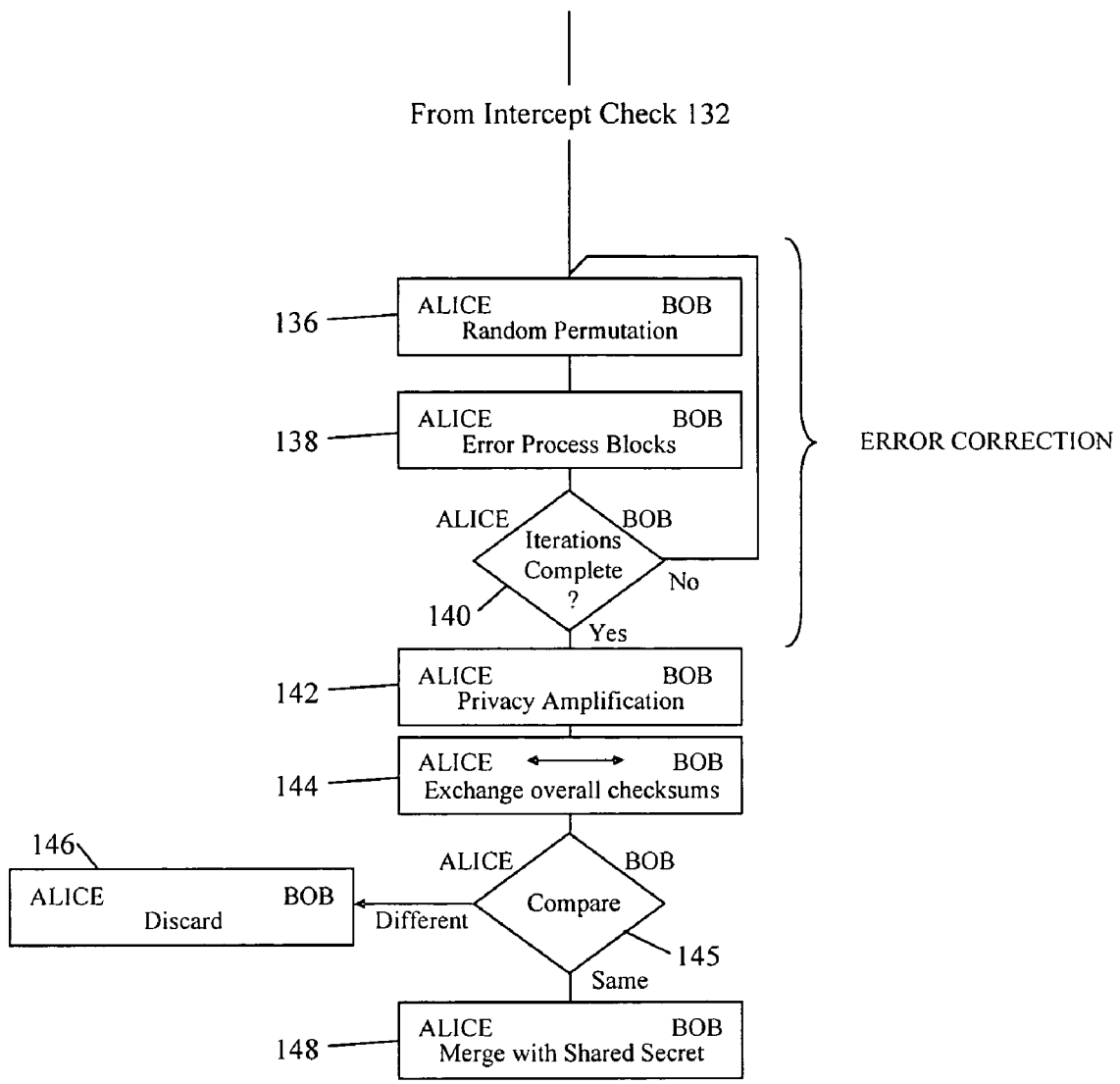

The convention is followed that the transmitting side for the quantum signal is referred to as Alice and the receiving side as Bob. In FIGS. 4A and 4B, the appearance of the name of Alice and/or Bob in block capitals in relation to a particular step indicates the active involvement of Alice and/or Bob, as the case may be, in that step.

When a user activates the QKD transmitting apparatus 2 in step 100 (FIG. 4A) via the user interface 47, Alice will initiate a dialog with Bob using the classical communication channel set up via the transceivers 12 and 50. Alice tells Bob who she is and Bob responds by telling Alice who he is. According to the present embodiment, this is done using a cache of shared secrets possessed by Alice and Bob and either generated by previous interactions between them or downloaded from a trusted source Where the transaction terminal 5 is part of a network of such terminals, there may either be a unique set of shared secrets associated with Alice and the particular terminal (Bob) currently being used by Alice (in which case, each terminal will typically itself store the respective set of shared secrets it has in common with Alice), or the terminals may all use the same set of shared secrets for working with Alice (in which case the shared secrets are typically centrally stored for access by all terminals as required). Typically, the shared secrets will be of the order of 100 kbits to 10 Mbits long. The shared secrets can be considered as composed of: a||b||c||rest_of_secrets where a, b and c are, for example, each 64 bits (the symbol || representing string concatenation).

In step 102, Alice transmits (a) XOR (b) to Bob where XOR is the exclusive function. In step 104, Bob searches through his set of shared secrets looking for a match. Once the match is found, in step 106 Bob transmits (a) XOR (c) back to Alice. In step 108, Alice checks that this is the correct response. Both Alice and Bob then, in step 110, delete a, b and c from their set of shared secrets. i.e. shared secrets=rest_of_secrets.

When the QKD transmitting apparatus 2 and the QKD receiving apparatus 4 are optically aligned, the quantum signal emitted by the emitter 14 will pass through the lens 54 and be guided by optical fibre 57 to the quad-detector arrangement 85, and the polarization directions of the signal will align with those of the quad-detection arrangement 85.

Once the quantum channel has been established, a quantum key transfer can be made. The transfer of information based on quantum cryptography is carried out using a variant of the BB84 quantum coding scheme. The specific algorithm according to the preferred embodiment will now be described.

Alice and Bob have a predetermined agreement as to the length of a time slot in which a unit of data will be emitted. To achieve initial synchronisation, Alice in step 124 (see FIG. 4A) overdrives the alignment emitter 40 to produce a "START" synchronisation signal. Alternatively, the quantum signal channel can be used for synchronisation.

In step 126, Alice randomly generates a multiplicity of pairs of bits, typically of the order of $10^8$ pairs. Each pair of bits consists of a message bit and a basis bit, the latter indicating the pair of polarization directions to be used for sending the message bit, be it vertical/horizontal or diagonal/antidiagonal. A horizontally or diagonally polarised photon indicates a binary 1, while a vertically or anti-diagonally polarised photon indicates a binary 0. The message bit of each pair is thus sent over the quantum signal channel encoded according to the pair of polarization directions indicated by the basis bit of the same pair. Randomness in generating the pairs of bits can be achieved by a hardware random number generator such as a quantum-based arrangement in which a half-silvered mirror is used to pass/deflect photons to detectors to correspondingly generate a "0"/"1" with a 50:50 chance; an alternative form of random number generator can be constructed based around overdriving a resistor or diode to take advantage of the electron noise to trigger a random event.

When receiving the quantum signal from Alice, Bob randomly chooses which basis (pair of polarization directions) it will use to detect the quantum signal during each time slot and records the results.

The sending of the message bits of the randomly-generated pairs of bits is the only communication that need occur using the quantum channel. The remainder of the algorithm is carried out using the classical channel.

In step 128, Bob informs Alice of the time slots in which a signal was received and the basis (i.e. pair of polarization directions) thereof.

In step 130, Alice sends to Bob confirmation of which of those bases is correct. Alice and Bob then use the bits corresponding to the time slots where they used the same bases, as the initial new shared secret data. However, there may well be discrepancies (errors) between the versions of the new shared secret data held by Alice and Bob due, for example, to noise in the quad detector arrangement 85.

In step 132, error rate checking is carried out by Alice and Bob comparing their versions of a selected subset of the initial new shared secret data. The higher the error rate, the greater the probability is that the quantum signal has been intercepted. Error rates above about 12% are generally unacceptable and, preferably, an upper threshold of 8% is set since above this figure the number of bits available after error correction and privacy amplification is too low.

If the error rate is found to be greater than the 8% threshold, the session is abandoned and the new shared secret data is discarded (step 134).

If the error rate is below the 8% threshold, error correction is then carried out on the initial new shared secret data (after the latter have been reduced by discarding the subsets used for error rate determination).

Error correction is effected using a version of the CASCADE algorithm in which two basic steps 136, 138 (see FIG. 4B) are repeated until a stable condition is reached (typically after six or seven iterations); alternatively, and as indicated by step 140 in FIG. 6B, the number of iterations can be fixed. The two basic steps are:

(1) A preliminary step 136 in which Alice and Bob effect the same random permutation of their respective versions of the new shared secret data. This is done as follows. Alice and Bob use the same subset of bits (typically 64 bits) of their new shared secret data as a seed for a deterministic pseudo random number generator. This pseudo random number generator is used to permute the data. This way both Alice and Bob will permute their data in the same way. The shared secret is then reduced by the subset used as the seed for the random number generator. This permutation step is designed to do two things—it uniformly redistributes the bits in error and also make life difficult for external observers (who do not know how the bits are being redistributed).

The remaining new shared secret data is then treated as if divided into blocks of a size chosen such that for the measured error rate each block has, on average, one error.

(2) An error elimination step 138 in which Alice and Bob process each block of their respective versions of the shared secret data as follows. Both Alice and Bob determine the parity of the block and Bob sends its parity value to Alice. If Alice finds that Bob's parity value is the same value as Alice has determined for her block, that block is accepted as error free (although it could have any even number of errors); if Alice finds that her parity value differs from Bob's, the block is assumed to have one error (though it could have any odd number of errors); in this case, a binary search process is followed to track down the error. This search process involves the steps of halving the block in error, and determining which half contains the error by Bob sending Alice the parity of one of the half blocks which Alice compares with her parity value for the corresponding half block in her possession; if the parity values differ, the errored half block is the one being processed whereas if the parity values are the same, the errored half block is the one not being processed. The foregoing steps are then repeated for the errored half block and so on until the errored bit is identified). The errored bit is then either discarded or Bob flips the value of his version of the bit.

The above-described error correction process will generally achieve an error level of $1:10^6$ or better which is sufficient for present purposes.

However, it will be appreciated that the error correction process involves the exchange of considerable amounts of parity information between Bob and Alice which is potentially of use to an eavesdropper. It is also to be noted that although the error-rate-based intercept check carried out in step 132 will detect interception of any substantial portion of the quantum signal transmission, an eavesdropper may still be able to successfully intercept a small number of bits of the quantum signal as there will be a finite (though very small) probability that more than one photon is sent during a time slot over the quantum channel thereby leaving open the possibility that an eavesdropper with a beam splitter can capture one photon while allowing Bob to receive the other photon. Accordingly, a privacy amplification step 142 is next performed. In this step both Alice and Bob reduce the size of their respective versions of the new shared secret data using a deterministic randomizing permutation, the reduction in size being dependent on the amount of parity information exchanged and the level of security required.

A detailed discussion of privacy amplification can be found, for example, in the paper "Generalized Privacy Amplification", C. H. Bennett, G. Brassard, C. Crepeau, and U. M. Maurer; IEEE transactions on Information Theory, IT-41 (6), p 1915-1923. In general terms, it can be said that if the new shared secret x has a length of n bit after error correction, and the eavesdropper has at most k deterministic bits of information about the new shared secret, then if an appropriate class of hash function h( ) is applied to the secret random data:

$$\{0,1\}^n \rightarrow \{0,1\}^{n-k-s}$$

where s is a safety parameter $0<s<n-k$, the eavesdroppers expected information on h(x) is no more than $(2^{-s}/\ln 2)$ bits. Thus varying the value of (n−k−s) gives different levels of security for the result of the hash of x; in particular, increasing s increases the level of security.

After the error correction and privacy amplification, Alice and Bob are very likely to have the same result. However, in step 144 Alice and Bob seek to re-assure themselves that this is the case by exchanging a hash of their new shared secret data; to protect and authenticate the transmitted hash, it is XORed with bits popped from the store of shared secrets. If the hashes differ (checked in step 145), the newly shared data is discarded (step 146) together with the bits used from the store of shared secrets.

On the assumption that Alice and Bob have the same new data, they merge the new data in with the existing shared secret. This merging involves the use of a hash function to ensure that the external observer has no knowledge of the final shared secret.

Data from this new shared secret random data can then be used, for example, to generate a session key (for example, a 128 bit session key) for encrypting an exchange of application data between the transmitting apparatus and receiving apparatus over the classical channel, the data used for creating the session key being discarded from the shared secret.

It may be noted that it is not necessary to integrity check or authenticate the messages exchanged in the error correction phase (steps 136-140) because any interference with these messages by an eavesdropper will result in the check carried out in steps 144 and 145 being failed; all that is required is that the messages exchanged in step 144 are authenticated and integrity checked. Because of the processing overhead associated with authentication and integrity checking, the messages exchanged at least during the error correction phase are therefore not authenticated and integrity checked. In the above described QKD method, the authentication carried out on the messages exchanged in step 144 is effected by the XORing the hashes of the new shared secret data with elements of the previously-stored shared secret, it being assumed that Alice and Bob know the identity of the party holding the matching shared secret at least in the sense that it is the party with which they intend to share new secret random data. However, it is also possible to use any other suitable authentication method such as one based on public/private key pairs and public key certificates issued by a trusted authority and made available using a public key infrastructure.

It will be appreciated that many variations are possible to the above-described embodiment of the invention. Thus, for example, although in the above described method the newly generated and shared secret random data has been combined with a stored shared secret to form new secret shared random data for use in securing a classical communication channel between the device 1 and terminal 5, it is also possible to use the newly generated and shared secret random data directly as new secret shared random data for securing the classical communication channel, that is, without combining it with a stored secret. Indeed, the use of a stored shared secret can be dispensed with entirely though in this case some other way must be provided to authenticate the user to the transaction terminal 5 (and vice versa), for example, public/private key pairs can be used along with public key certificates issued by a trusted authority and made available using a public key infrastructure.

The initial party identification and authentication (steps 102-110) can be omitted or carried out using a different authentication method; however, it is preferred to include these steps as it prevents unnecessary usage of bits from the stored shared secret where Alice or Bob is communicating with an unintended party.

Although in the above described embodiment, error correction has been effected on the basis that Alice holds the reference data set, it would alternatively be possible to treat the data set held by Bob as the reference data set or to converge the data sets of Alice and Bob on some other basis.

The invention claimed is:

1. A quantum key distribution (QKD) method comprising:
   sending random data from a QKD transmitter to a QKD receiver over a quantum signal channel, the QKD transmitter randomly selecting first bases for encoding the random data, the QKD receiver randomly selecting second bases to detect the random data, and the QKD transmitter and receiver respectively processing the random data transmitted and received over the quantum signal channel with the aid of first messages exchanged between them over an insecure classical communication channel in order to seek to derive a common random data set, the first exchanged messages enabling the QKD transmitter and receiver to determine for which bits of the random data the first bases selected by the QKD transmitter and the second bases selected by the QKD receiver are the same, said processing concluding with a check, effected by an exchange of second authenticated messages over the classical communication channel, that the QKD transmitter and receiver have derived the same said random data set, and at least some of the first messages exchanged during said processing being exchanged without the first messages being authenticated and integrity checked.

2. A QKD method according to claim 1, wherein said processing includes an error correction phase, the first messages exchanged during the error correction phase being exchanged without being authenticated and integrity checked.

3. A QKD method according to claim 1, wherein the second messages exchanged during said check are authenticated by combination with elements of a pre-existing shared secret possessed by the QKD transmitter and receiver.

4. A QKD method according to claim 1, further comprising an initial authentication step effected between the QKD transmitter and receiver by the exchange of third messages over the classical communication channel.

5. A QKD method according to claim 4, wherein the QKD transmitter and receiver each possess the same pre-existing random secret, the authentication step comprising one of the QKD transmitter and receiver, herein the first QKD apparatus, combining first and second elements of its pre-existing random secret to determine a first result and sending the first result to the other of the QKD transmitter and receiver, herein the second QKD apparatus;

the second QKD apparatus seeking to match the first result received from the first QKD apparatus with a combination of the first and second elements of its pre-existing random secret;

the second QKD apparatus combining first and third elements of its pre-existing random secret to determine a second result and sending the second result to the first QKD apparatus; and the first QKD apparatus seeking to match the second result received from the second QKD apparatus with a combination of the first and third elements of its pre-existing random secret.

6. A quantum key distribution (QKD) transmitter comprising: a quantum signal transmitter for transmitting random data to a QKD receiver by encoding the random data using randomly selected first bases; an insecure classical communication transceiver; and a processor for processing the random data transmitted by the quantum signal transmitter, with the aid of first messages exchanged with the QKD receiver via the classical communication transceiver, in order to seek to derive a common random data set, the first exchanged messages enabling the processor to determine for which bits of the random data the first bases selected by the QKD transmitter and second bases selected by the QKD receiver to detect the random data are the same, and the processor being arranged to conclude said processing with a check, effected by an exchange of second authenticated messages with the QKD receiver via the classical communication transceiver, that the QKD transmitter and receiver have derived the same said random data set, the QKD transmitter being so arranged that at least some of the first messages exchanged during said processing are exchanged without the first messages being authenticated and integrity checked.

7. A QKD transmitter according to claim 6, wherein said processing includes an error correction phase, the first messages exchanged during the error correction phase being exchanged without being authenticated and integrity checked.

8. A QKD transmitter according to claim 6, wherein the processor is arranged to participate in authentication of the second messages exchanged during said check by combining the second messages with elements of a pre-existing shared secret.

9. A QKD transmitter according to claim 6, wherein the processor is arranged to effect an initial authentication step in which it authenticates itself to the QKD receiver and authenticates the QKD receiver, by the exchange of third messages over the classical communication channel.

10. A quantum key distribution (QKD) receiver comprising:

a quantum signal receiver for receiving random data from a QKD transmitter, the quantum signal receiver being arranged to decode the random data using randomly selected first bases;

an insecure classical communication transceiver; and a processor for processing the random data received by the quantum signal receiver, with the aid of first messages exchanged with the QKD transmitter via the classical communication transceiver, in order to seek to derive a common random data set, the first exchanged messages enabling the processor to determine for which bits of the received random data second bases selected by the QKD transmitter to encode the random data and the first bases selected by the QKD receiver are the same, and the processor being arranged to conclude said processing with a check, effected by an exchange of second authenticated messages with the QKD transmitter via the classical communication transceiver, that the QKD transmitter and receiver have derived the same said random data set, the QKD receiver being so arranged that at least some of the first messages exchanged during said processing are exchanged without the first messages being authenticated and integrity checked.

11. A QKD receiver according to claim 10, wherein said processing includes an error correction phase, the first messages exchanged during the error correction phase being exchanged without being authenticated and integrity checked.

12. A QKD receiver according to claim 10, wherein the processor is arranged to participate in authentication of the second messages exchanged during said check by combining the second messages with elements of a pre-existing shared secret.

13. A QKD receiver according to claim 10, wherein the processor is arranged to effect an initial authentication step in which it authenticates itself to the QKD transmitter and authenticates the QKD transmitter, by the exchange of third messages over the classical communication channel.

* * * * *

UNITED STATES PATENT AND TRADEMARK OFFICE
CERTIFICATE OF CORRECTION

PATENT NO. : 7,864,958 B2
APPLICATION NO. : 11/454632
DATED : January 4, 2011
INVENTOR(S) : Keith Alexander Harrison et al.

It is certified that error appears in the above-identified patent and that said Letters Patent is hereby corrected as shown below:

In column 9-10, lines 55-67 (col. 9) and lines 1-9 (col. 10), in Claim 6,
delete "A quantum key distribution (QKD) transmitter comprising: a quantum signal transmitter for transmitting random data to a QKD receiver by encoding the random data using randomly selected first bases; an insecure classical communication transceiver; and a processor for processing the random data transmitted by the quantum signal transmitter, with the aid of first messages exchanged with the QKD receiver via the classical communication transceiver, in order to seek to derive a common random data set, the first exchanged messages enabling the processor to determine for which bits of the random data the first bases selected by the QKD transmitter and second bases selected by the QKD receiver to detect the random data are the same, and the processor being arranged to conclude said processing with a check, effected by an exchange of second authenticated messages with the QKD receiver via the classical communication transceiver, that the QKD transmitter and receiver have derived the same said random data set,
the QKD transmitter being so arranged that at least some of the first messages exchanged during said processing are exchanged without the first messages being authenticated and integrity checked." and
insert -- A quantum key distribution (QKD) transmitter comprising:
a quantum signal transmitter for transmitting random data to a QKD receiver by encoding the random data using randomly selected first bases;
an insecure classical communication transceiver; and
a processor for processing the random data transmitted by the quantum signal transmitter, with the aid of first messages exchanged with the QKD receiver via the classical communication transceiver, in order to seek to derive a common random data set, the first exchanged messages enabling the processor to determine for which bits of the random data the first bases selected by the QKD transmitter and second bases selected by the QKD receiver to detect the random data are the same, and the processor being arranged to conclude said processing with a check, effected by an exchange of second authenticated messages with the QKD receiver via the classical communication Signed and Sealed this
Fourteenth Day of June, 2011

David J. Kappos
*Director of the United States Patent and Trademark Office* transceiver, that the QKD transmitter and receiver have derived the same said random data set,
the QKD transmitter being so arranged that at least some of the first messages exchanged during said processing are exchanged without the first messages being authenticated and integrity checked. --, therefor.